UNITED STATES PATENT OFFICE.

ERNEST ALFRED ALEXANDRE VALLÉE AND ANDRÉ HELBRONNER, OF PARIS, FRANCE.

TREATMENT OF OSSEIN.

No. 914,996.      Specification of Letters Patent.      Patented March 9, 1909.

Application filed September 10, 1906. Serial No. 334,035. (Specimens.)

*To all whom it may concern:*

Be it known that we, ERNEST ALFRED ALEXANDRE VALLÉE, engineer, and ANDRÉ HELBRONNER, engineer, both citizens of the French Republic, residing at Paris, France, have invented certain new and useful Improvements in and Relating to the Treatment of Ossein, of which the following is a specification.

This invention relates to a process of treating ossein for obtaining a product for use in the manufacture of artificial threads, photographic emulsions, plastic materials, coatings, and for other purposes wherein the product is found applicable.

A process for treating ossein in accordance with this invention is set forth by the following example,—1 kg. of broken bone is subjected at an ordinary temperature to a solution of sulfurous acid for twelve hours, the acid not only decolorizing the ossein but also dissolving the lime of the bone. After the ossein has been subjected to the solution of sulfurous acid for the time specified, it is then washed in running water which eliminates the dissolved products. After being washed, the humid mass is then allowed to digest in an alkaline solution consisting of 5 kg. of water and 800 gr. of soap maker's soda lye, the temperature during the digestion of the material being the ordinary temperature and the length of the digestion period being about four days.

The mass obtained by the foregoing steps differs completely from gelatin as the mass is soluble in cold water, whereas on the other hand gelatin is insoluble in cold water. The mass can be precipitated by ferrocyanid of potassium in acetic acid solution or by sulfate of copper, whereas gelatin is not precipitated by ferrocyanid of potassium in an acetic solution or by sulfate of copper. After the material has been digested in the alkaline solution, it is kneaded to destroy any lumps which may be formed therein. The material which then contains excess of alkali is neutralized by a suitable acid, by way of example, hydrochloric acid, and then washed with a saturated saline solution in which the material is insoluble, the saturated saline solution being by way of example a solution of sulfate of ammonia. This washing permits of obtaining a mass of neutral re-action which presents itself in the solid state when the excess of lye has been expressed. This latter carries with it all the soluble salts which may still be contained in the mass.

The substance resulting from the foregoing steps and which presents itself in the form of cakes is then dissolved in a liquid which may vary in accordance with the subsequent utilization for which the solution is intended, *i. e.* water, acids, alkaline, caustic or carbonated solutions, ammoniacal solutions of metallic oxids, glycerinated sulfate of copper, concentrated and hot chlorid of zinc. This product presents the same chemical properties as the raw mass, and is thus differentiated from gelatin.

The solution obtained may be precipitated or coagulated and the precipitation or coagulation effected by means of a certain number of mineral or organic products employed alone or simultaneously, such as sulfate of ammonia, chlorid of zinc, sulfate of copper, alkaline sulfates, chlorid of sodium, to which has been added tannin or oxalic acid, alcohol, acetone.

What we claim is:—

1. The herein described process of treating ossein consisting in subjecting broken bone to the action of a solution of sulfurous acid at an ordinary temperature to decolorize the ossein in the bone and also dissolve the lime therein, washing the substance thus treated in running water to eliminate the dissolved products, digesting the resulting humid mass in an alkaline solution, kneading the digested material to destroy any lumps, neutralizing the excess alkali in the material by a suitable acid and then washing the same with a saturated saline solution such as sulfate of ammonia, and then dissolving the resultant substance in a liquid which may vary in accordance with the subsequent utilization of the solution.

2. The herein described process of treating ossein consisting in subjecting broken bone to the action of a solution of sulfurous acid at an ordinary temperature to decolorize the ossein in the bone and also dissolve the lime therein, washing the substance thus treated in running water to eliminate the dissolved products, digesting the resulting humid mass in an alkaline solution, kneading the digested material to destroy any lumps, neutralizing the excess alkali in the material by a suitable acid and then washing the same with a saturated saline solution such as sulfate of ammonia, then dissolving the resultant substance in a liquid which may vary in accordance with the subsequent utilization of the solution, and precipitating the solution obtained.

3. The herein described process consisting in digesting ossein at an ordinary temperature in an alkaline solution to form a colloidal mass, kneading the mass to destroy any lumps which may be formed therein, subjecting the mass to a suitable neutralizing acid and a saline solution in which the mass is insoluble to eliminate the excess of alkali and the saline soluble salts, then dissolving the mass, and finally coagulating the solution.

In testimony whereof we have hereunto set our hands in presence of two subscribing witnesses.

ERNEST ALFRED ALEXANDRE VALLÉE.
  ANDRÉ HELBRONNER.

Witnesses:
 PAUL BLUM,
 MAX DE RIVAUD.